United States Patent [19]

Goeman

[11] 4,090,884

[45] May 23, 1978

[54] INHIBITORS FOR ALKALI-GLASS REACTIONS IN GLASS FIBER REINFORCED CEMENT PRODUCTS

[75] Inventor: Friedrich Goeman, Stone Mountain, Ga.

[73] Assignee: W. R. Bonsal Company, Lilesville, N.C.

[21] Appl. No.: 705,884

[22] Filed: Jul. 16, 1976

[51] Int. Cl.$^2$ .............................................. C04B 7/02
[52] U.S. Cl. .................................................... 106/99
[58] Field of Search .................................... 106/99, 98

[56] References Cited

U.S. PATENT DOCUMENTS 3,969,567   7/1976   Occleshaw et al. .................. 106/99

*Primary Examiner*—J. Poer
*Attorney, Agent, or Firm*—Bell, Seltzer, Park & Gibson

[57] ABSTRACT

A glass reinforced cement composition containing a scavenger material as an inhibitor to prevent or greatly reduce attack and degradation of the glass reinforcement by the alkali content of the inorganic alkaline cement binder. The scavenger is a finely divided alkali-reactive material which contains silica as the major constituent thereof, and which has a reactivity with the alkali content of the binder substantially greater than the reactivity of the glass reinforcement therewith whereby the alkali content of the binder reacts with the scavenger in preference to reacting with the glass reinforcement.

3 Claims, No Drawings

INHIBITORS FOR ALKALI-GLASS REACTIONS IN GLASS FIBER REINFORCED CEMENT PRODUCTS

This invention relates to the utilization of glass as a reinforcement for cementitious articles, and more particularly to a method and composition wherein attack and degradation of the glass reinforcement by the alkali content of the inorganic cementitious binder is eliminated or greatly reduced.

BACKGROUND OF THE INVENTION

The use of glass as a reinforcement for cementitious materials such as concrete has been investigated for many years. Consideration has been given to the use of glass fiber rods to replace conventional steel reinforcement, as well as to the use of glass reinforcement in the form of fibers, flakes and woven or nonwoven fabrics. Particular attention has been given recently to the use of glass fibers as a reinforcement for concrete and cement.

A serious obstacle in employing glass as a reinforcement in cement and concrete is the alkaline environment of the inorganic cementitious binder, which is highly deleterious to the glass and results in significant loss of strength in the reinforced cement or concrete products over a period of time, or even in total destruction of the glass reinforcement. Attack and destruction of the glass reinforcing properties is particularly rapid under humid conditions.

Prior approaches to overcoming the problem of alkali attack of the glass reinforcement have included the use of low alkali type cements, the use of organic coatings to protect the glass from the alkali, the use of specialized alkali resistant glass compositions (see U.S. Pat. Nos. 3,861,925, 3,861,926 and 3,861,927), and the use of a cation exchange material to change the inorganic alkaline binder into a form in which it does not attack glass.

However, the above-mentioned prior approaches have not been entirely successful in producing a practical, commercial glass reinforced cement composition. The limited availability and expense of the specialized materials required in these approaches renders the use of these materials unfeasable for many applications.

OBJECTS AND SUMMARY OF THE INVENTION

With the foregoing in mind, it is a primary object of this invention to provide a practical and economical method of inhibiting alkali attack on the glass reinforcement in glass-reinforced cementitious compositions.

It is a further object of this invention to provide in a glass reinforced cementitious composition, an environment in which reaction between alkali content of the cementitious binder and glass reinforcement is eliminated or greatly reduced.

More particularly, it is an object of this invention to provide such an environment in a practical and economical manner using readily available materials.

It is still a further object of this invention to provide a glass reinforced cement mix composition wherein undesirable reaction between the alkali content of the cementitious binder and the glass reinforcement is eliminated or greatly reduced, and which composition is suitable for use in numerous applications such as in cement or concrete articles or for surface bonding of cement blocks or the like.

The present invention is based upon the discovery that certain readily available inexpensive materials, when mixed with the alkaline inorganic binders commonly employed in cement and concrete, will operate as a "scavenger" and react with the alkali content of the binder before the glass reinforcement is attacked thereby. The invention thus makes possible the production of articles having properties and economics heretofore unavailable in glass reinforced materials with alkaline inorganic binders.

Several prior patents have proposed the use of certain chemicals for inhibiting damage or etching of glass bottles by the hot alkaline cleaning solutions used in glass cleaning plants. See for example Wegst U.S. Pat. Nos. 2,403,157, 2,419,805, 2,425,907, 2,428,187 and 2,447,297.

Other patents and publications have proposed the use of certain chemicals for inhibiting the formation of the harmful expansion producing silica salts due to alkali-aggregate reactions in concrete. Note for example McCoy U.S. Pat. No. 2,744,831.

Still another patent (Shannon U.S. Pat. No. 3,147,127) has proposed the use of certain specialized cation exchange materials in glass reinforced cement products for the purpose of reconstituting the Portland cement binder into a form which will not attack glass. The process involves a displacement reaction in which the reactive alkali cations are substituted by other cations. The economic feasibility of this process is restricted however due to the limited availability of the cationic exchange materials and the necessity for pretreatment of the cationic exchange materials with acid or ammonium compounds prior to use thereof.

The scavenger material used in accordance with the present invention is inexpensive and readily available and does not require any pretreatment prior to its use. The use of this scavenger material in glass reinforced cement or concrete articles permits the use of ordinary E-glass reinforcing elements instead of the more expensive and sometimes unavailable alkali-resistant types of glass. The glass reinforced cement mix compositions of this invention are suitable for numerous applications, including use in high strength construction elements, cast or extruded concrete articles, and for surface bonding of concrete blocks and the like.

The inorganic binders used in accordance with the present invention may include Portland cement, masonry cement, mixtures of Portland cement and masonry cement, and mixtures of the foregoing with hydrated lime. The cement composition may also include aggregate fillers such as sand and additive admixtures such as pigments, plasticizers, water reducing admixtures, waterproofing admixtures, shrinkage compensators, set accelerations, retarders, gas forming agents, airentraining admixtures, and water retaining admixtures.

Some of the objects, features and advantages of the invention having been stated, others will become apparent from the description which follows, which is intended to illustrate and disclose, but in no way limit, the invention.

DETAILED DESCRIPTION OF THE INVENTION

The "scavenger" material herein described is a finely divided alkali reactive material whose major constituent is silica in alkali reactive form, the same compound which is present in large amounts in the glass reinforcement. The effectiveness of the scavenger material to react with the alkali content of the inorganic binder is the great affinity and availability of the scavenger material to the alkali due to its intense dispersion and active surface area.

The glass reinforcement, by contrast, is in the form of relatively large elements such as rods, fibers or bundles of fibers, usually coated with a protective size or an organic binder, and most commonly dispersed in the cement in the form of chopped fibers or bundles of fibers, or as woven or nonwoven fabrics.

The scavenger material is a finely ground powder, preferably of 30-325 mesh (U.S. Sieve Series). Most desirably, the silica content of the scavenger material is at least 65% by weight.

Silica may take a number of crystalline or amorphous forms, some of which are relatively inert, other forms being highly alkali reactive. The silica-containing materials used as scavenger materials in accordance with the present invention must be of the alkali-reactive type. Such alkali-reactive silica compounds are generally vitreous in nature and differ from ordinary sand in that they exhibit a relatively high solubility in water or alkaline solutions at room or elevated temperatures. As examples of materials suitable for use as scavenger materials, particular mention may be made of silica flour and ground soda-lime glass.

The suitability of silica-containing materials as scavenger materials (i.e. their reactivity) may be readily ascertained by comparing the relative solubility of the silica containing material with the solubility of the glass reinforcement. The scavenger compound should have a higher solubility in alkali solutions or in water at room temperature or at elevated temperature or preferably both. Preferably, the scavenger material should have a solubility at least twice that of ordinary E-glass reinforcement, and most desirably about ten times as great or higher.

Table 1 compares the solubility rates of two suitable scavenger materials with the solubility rate of a typical glass fiber reinforcement. Scavenger I is commercial silica flour, 325 mesh, 97% SiO$_2$. Scavenger II is ground soda-lime glass, passing a 100 mesh sieve, and having the following composition:

| | |
|---|---|
| Silica (SiO$_2$) | 69.2% |
| Aluminum Oxide (Al$_2$O$_3$) | 1.1% |
| Calcium Oxide (CaO) | 8.0% |
| Magnesium Oxide (MgO) | 3.6% |
| Boric Oxide (B$_2$O$_3$) | 0.0% |
| Sodium Oxide (Na$_2$O) | 14.5% |
| Potassium Oxide (K$_2$O) | 2.0% |

The scavengers were tested for their rate of solubility in alkaline solutions by placing a measured amount of the component in a sodium hydroxide solution calculated to have a SiO$_2$: Na$_2$O ratio of 3.31. The solubility was established at 2 different temperatures and expressed as milligrams per kilogram soluble SiO$_2$ and compared to typical type E glass fiber reinforcement.

TABLE 1

| Days at 77°F | Scavenger I (97% SiO$_2$) | Scavenger II (69% SiO$_2$) | ¼″ Glass Fiber (53% SiO$_2$) |
|---|---|---|---|
| 1 | 4,000 | 9,000 | 2,000 |
| 2 | 4,500 | 22,000 | 6,200 |
| 3 | 6,000 | 33,000 | 10,000 |
| 4 | 6,800 | 52,000 | 12,000 |
| 8 | 10,000 | 94,000 | 16,500 |
| 13 | 13,000 | 140,000 | 21,000 |
| 22 | 17,000 | 230,000 | 24,500 |
| 1 | 19,000 | 84,000 | 17,000 |
| 2 | 52,000 | 260,000 | 22,000 |
| 3 | 76,000 | 340,000 | 23,000 |
| 4 | 110,000 | 390,000 | 24,000 |
| 8 | 230,000 | 430,000 | 26,000 |
| 14 | 470,000 | 460,000 | 26,000 |

For most effective results, the scavenger material should be incorporated in the cement composition in an amount at least sufficient for substantially complete reaction with the alkali content of the inorganic binder. For optimum results, the amount required should be in excess of the amount required for substantially complete reaction. The stochiometric proportion, i.e. the amount of silica required to react with the alkali content of the binder, can be calculated directly, given the alkali content of the binder and the silica content of the scavenger material. These figures are readily available from chemical analysis of these materials.

The following chemical reaction is used to calculate stochiometric proportion:

$$Na_2O + SiO_2 \rightarrow Na_2SiO_3$$

For an inorganic binder (e.g. Portland cement) containing $x$ % total alkali, calculated as Na$_2$O, and a scavenger containing $y$% SiO$_2$, the following formula will give the required amount of Scavenger Inhibitor.

| | |
|---|---|
| MSI | = required parts by weight of Scavernger per 100 parts of Binder. |
| $x$ | = % alkali in the Binder. (Na$_2$O Equiv.) |
| $y$ | = % SiO$_2$ in the Scavenger. |
| M.W. Na$_2$O | = 62 |
| M.W. SiO$_2$ | = 60 |
| MSI | $= \left(\dfrac{x}{M.W. Na_2O}\right) \times (M.W. SiO_2) \times \left(\dfrac{1}{y}\right)$ |
| or | |
| MSI | $= 96.77 \dfrac{x}{y}$ |

Since only a portion of the alkali content of the binder is water soluble and available for reaction, the foregoing relationship generally provides a more than sufficient amount of scavenger for reaction with the available alkali.

The reaction of silica with the alkali content of inorganic cementitious binders such as Portland cement is understood to involve a number of rather complex reactions, in addition to the primary reaction shown above. However, calculations based upon the above reaction have been found to be a convenient and entirely suitable basis for determining the required amount of scavenger material.

Table 2 shows the minimum amount of scavenger material which should be employed with Portland cement of various alkali contents. The term "parts", in the table refers to parts by weight.

TABLE 2

| Dry Portland Cement Type I, ASTM Spec C-150 percent total alkalies, expressed as $Na_2O$ | Minimum Parts of Scavenger Required per 100 parts of Portland cement | |
|---|---|---|
| | Scavenger I (97% $SiO_2$) | Scavenger II (69% $SiO_2$) |
| 1.0% | .99 | 1.38 |
| 0.8% | .79 | 1.10 |
| 0.6% | .59 | .82 |
| 0.4% | .39 | .55 |
| 0.2% | .19 | .27 |

It is known in the cement industry that certain reactions involving the alkali in Portland cement with certain reactive forms of silica can result in the formation of soluble silica complexes which may imbibe water and expand, with the resulting expansion causing severe damage to the cementitious products. The indiscriminate use of the alkali reactive silica containing scavenger materials may contribute to this harmful side effect, and for this reason it is preferred to limit the amount of scavenger material employed to, at maximum, a fivefold excess of that sufficient for complete reaction with the alkali content of the inorganic binder.

To further insure against the above noted expansion reactions, it is desirable to include in the cement composition certain chemical inhibitors known for their ability to inhibit such expansion reactions. Any of the materials meeting the classification of inhibiting alkali-aggregate reaction when tested in accordance with ASTM method C-441 may be suitably employed as expansion inhibitors in the compositions of the present invention. Suitable as chemical expansion inhibitors are the water soluble salts of elements selected from the group consisting of Ba, Li, Sr, Bi, Sn and Sb including the chloride, hydroxide, acetate, nitrate, and chromate salts of these elements. Also suitable as expansion inhibitors are known expansion reducing pozzolanic materials such as calcined shale, diatomaceous earth, volcanic tuffs and pumicites, and opal.

The silica-containing scavenger material may be used without an expansion inhibitor in low alkali cement compositions. In particular, the expansion inhibitor is not necessary in those cements having an alkali content of less than 0.2%, expressed as $Na_2O$, since it has been demonstrated that with an alkali content less than this amount alkali-aggregate expansion reaction is not a problem.

The chemical expansion inhibitors, when used, are preferably provided in a minimum amount sufficient to react with the silica content of the scavenger inhibitor. Thus, for example, based upon the reaction $SiO_2 + BaO + xH_2O \rightarrow BaSiO_3 \cdot xH_2O$, for complete reaction with the $SiO_2$, it would take 2.08 parts $BaCl_2$, 2.61 parts $BaNO_3$, 3.15 parts of $Ba(OH)_2$ or 2.55 parts of Ba $(C_2H_3O_2)$ to one part of $SiO_2$.

The alkaline inorganic binder employed in cement compositions in accordance with this invention may include masonry cement, Portland cement, mixtures of masonry cement and Portland cement, and mixtures of any of the above with hydrated lime. Portland cement is preferred and cements having an alkalinity of as high as 1.5% by weight, based upon $Na_2O$, may be suitably employed in the compositions of this invention. Portland cements classified under ASTM specification C-150 as type I cements have been tested and found particularly acceptable for the glass reinforced cement compositions of this invention.

The cement composition may also include the conventional types of fillers used in cement and concrete products such as gravel, sand, natural or manufactured aggregates, or crushed marble. Fine mineral aggregates (20 mesh or finer) are preferred in the compositions when chopped glass reinforcement is used to obtain proper dispersion of the glass reinforcement and optimum reinforcing function therefrom. The filler is preferably used in amounts ranging from 0 to 300 parts per 100 parts of dry cement binder.

Additives known in the cement and concrete industry as "admixtures" may also be included in the cement compositions. These are compounds or materials known to improve or alter the cement characteristics and are generally incorporated in amounts up to about 20% by weight based upon the dry weight of the cement binder. Products classified as admixtures include pigments, water reducing admixtures, water retaining admixtures, airentraining admixtures, set accelerators, gas forming additives, water proofing admixtures, expansion producing admixtures, shrinkage compensation admixtures, and plasticizers.

The glass reinforcement may be in the form of fibers, chopped yarns or rovings, flakes, rods, and woven or non-woven fabrics. Preferably however, the reinforcement is in the form of individual glass fibers or bundles of fibers chopped to a length of about one-fourth inch to two inches, most desirably about one-half inch. Commercially available borosilicate Type E glass may be suitably employed. However, other types of commercially available glass, such as the various alkali-resistant types of glass may be also employed, if desired. The amount of glass reinforcement employed is preferably within the range of 2 to 15 parts per 100 parts of dry cement binder, and most desirably within the range of 2 to 5 parts.

The dry mix glass reinforced cement compositions in accordance with this invention may be formed into various articles, including construction elements for use in applications requiring high tensile and compressive strength, cast or extruded concrete articles such as decorative veneers, concrete panels, concrete pipes or conduits.

The compositions are also particularly suitable as surface bonding cements for applying to the surface of a concrete block wall and the like for bonding the blocks together without the necessity of mortar between the blocks as has been customarily done in the past. The surface bonding cement provides a moisture resistant, stucco appearance on the surface of the wall and the thus bonded concrete blocks may be utilized for one or two stories, single and multi-family dwellings, warehouses and other commercial buildings up to two stories, below grade basement walls, low cost masonry housing units, farm buildings, and a variety of other applications. When the composition is employed as a surface bonding cement, it should be mixed with water to a creamy consistency and applied by spraying or by trowel to the surface of the stacked block or brick wall, preferably about one-eighth inch thick and up to one-fourth inch thick.

Typical glass reinforced cement compositions incorporating inhibitors in accordance with the present invention are shown in Table 3 below:

TABLE 3

|  | (parts by weight) | | | | | | |
|---|---|---|---|---|---|---|---|
|  | A | B | C | D | E | F | G |
| Low alkali Portland cement (.13% Na$_2$O) | 100 | 0 | 0 | 0 | 0 | 0 | 0 |
| Portland cement (.45% Na$_2$O) | 0 | 100 | 100 | 0 | 0 | 100 | 100 |
| Masonry cement | 0 | 0 | 0 | 100 | 100 | 100 | 100-150 |
| Hydrated lime | 10-30 | 10-30 | 10-30 | 0-15 | 0-15 | 0-25 | 0-15 |
| Fine aggregate | 0-25 | 0-25 | 100-300 | 0-25 | 100-300 | 0-25 | 100-300 |
| Glass fiber reinforcement | 2-10 | 2-10 | 2-10 | 2-10 | 2-10 | 2-10 | 2-10 |
| Expansion inhibitor* | 0 | 0.3 | 0.3 | 0.3 | 0.3 | 0.3 | 0.3 |
| Admixtures | 0 | 0-1 | 0-1 | 0-1 | 0-1 | 0-1 | 0-1 |
| Scavenger inhibitor ** | .2-1.0 | .4-3.0 | .4-3.0 | .2-6.0 | .2-6.0 | .2-6.0 | .2-6.0 |

\* or 10-20% by weight of total scavenger inhibitor used
\*\* or 1 to 5 times the amount needed to react with the alkali content of cement A composition having particular suitability as a surface bonding cement has the following analysis (parts by weight):

| Portland Cement (0.3% Na$_2$O) | 100 |
|---|---|
| Hydrated Lime | 13-22 |
| Fine Aggregate (20 mesh sand) | 100-160 |
| Glass Fiber Reinforcement (1/2") | 4-7 |
| Airentraining Admixture | .02-.06 |
| Scavenger Inhibitor (Soda glass powder) | .4-2 |
| Expansion Inhibitor (BaCl$_2$) | .5-3 |
| Set Accelerating Admixture | 1-3 |
| Water Retaining Admixture | .1-.4 |
| Mineral Oxide Pigments | 0-12 |

EXAMPLE I

A comparison was made of the solubility rate in alkali environment of two commercially available type-E glass fiber reinforcements and two commercially available alkali resistant glass fibers known as CemFil (zirconium glass) and K-glass. The comparison was made at two different temperatures extended to 28 days, expressed in parts per million (ppm).

TABLE 4

|  | Soluble Silica (SiO$_2$) ppm | | | | | |
|---|---|---|---|---|---|---|
|  | 77° F | | | 122° F | | |
|  | 1 day | 7 days | 28 days | 1 day | 7 days | 28 days |
| E-glass (Code 13726-25200) 1/2" chopped strand | 200 | 8,400 | 37,000 | 8000 | 41,400 | 64,000 |
| E-glass (code X 12 K 3 B) 1/2" chopped strand | 1700 | 19,000 | 46,000 | 20,000 | 32,500 | 49,000 |
| K-glass (code 72B52464) 1/2" chopped strand | 400 | 3,400 | 15,000 | 10,000 | 60,800 | 185,000 |
| CemFil (0309308) (Zirconia) 12 mm #647 | 100 | 500 | 1525 | 1000 | 9900 | 33,000 |

In each instance 20 grams of fiber was placed in polyethylene bottles in a solution of 1.0 N NaOH. Soluble Silica was determined colorimetrically.

EXAMPLE II

The compositions listed in Table 5 below were prepared, the dry ingredients being thoroughly dry blended before the water additions were made. Under constant agitation the slurries were kept at 200° F for 4 hours. Thereafter, the slurries were strained and the glass fibers collected, rinsed clean, and examined by Electron Scanning Microscope at a magnification of 10,000 times for surface pitting and other signs of fiber corrosion.

TABLE 5

|  | FORMULA (parts by weight) | | | | |
|---|---|---|---|---|---|
|  | A | B | C | D | E |
| Portland Cement(0.8 Na$_2$O) | 0 | 0 | 0 | 40 | 0 |
| Portland Cement (0.4 Na$_2$O) | 40 | 40 | 40 | 0 | 40 |
| Hydrated Lime(0.21 CaO) | 7 | 7 | 7 | 7 | 7 |
| Natural Silica Sand | 50 | 50 | 50 | 50 | 50 |
| Soda Lime Glass Powder | 1.5 | 1.5 | 0 | 0 | 0 |
| BaCl$_2$ inhibitor | 0 | 2 | 2 | 0 | 0 |
| 1/2" chopped E-glass fibers | 2 | 2 | 2 | 0 | 0 |
| 1/2" chopped K-glass fibers | 0 | 0 | 0 | 2 | 0 |
| Water | 200 | 200 | 200 | 200 | 200 |

The glass fibers have the following compositions:

| Alkali Resistant K-Glass (U.S. Pat. No. 3861925) | | E-Glass | |
|---|---|---|---|
| SiO$_2$ | - 63.8% | SiO$_2$ | - 52.6% |
| TiO$_2$ | - 13.2% | Al$_2$O$_3$ | - 14.6% |
| CaO | - 5.4% | CaO | - 17.6% |
| Na$_2$O | - 15.0% | MgO | - 4.0% |
| K$_2$O | - 2.6% | B$_2$O$_3$ | - 6.6% |
| Fe$_2$O$_3$ | - trace | Na$_2$O | - 1.4% |
| Al$_2$O$_3$ | - trace | K$_2$O | - 1.9% |
| ZrO$_2$ | - trace | organic binder | 1.3% |

Formulas A, B and D did not show any sign of surface corrosion. Surface corrosion and pitting was identified in Formula C, and Formula E. This shows that soda lime glass powder effectively inhibited alkali attack on the glass fibers.

EXAMPLE III

Fibers subjected to the conditions set forth in Example II were incorporated into 1 inch × 1 inch × 1¼ inches mortar bar test specimens and tested for flexural strength in accordance with ASTM-C-78, for tensile strength according to procedures designated ASTM-C-190, and for compressive strength in compliance ASTM-C-109 test method. The specimens were cured for 28 days in a moist room kept at 75° F and 90% rel. humidity. The results are shown in Table 6 below.

TABLE 6

| Sample | Flexure MOR 28 days | Tensile psi 28 days | Compression psi 28 days |
| --- | --- | --- | --- |
| Control Matrix without fibers (no inhibitors) | 630 psi | 80 psi | 4800 psi |
| 2% E-glass fibers + Soda Lime Glass (Formula B of Example II) | 1200 psi | 450 psi | 3852 psi |
| 2% - K-glass fibers (no inhibitors) (Formula D of Example II) | 1150 psi | 525 psi | 4200 psi |
| 2% E-glass fiber + Silica Flour | 1290 psi | 470 psi | 3600 psi |

This test clearly demonstrates the significance of the invention in that ordinary glass reinforcement, normally susceptible to alkali corrosion, can perform equally as well as special alkali resistant glass, the latter being more expensive and in limited supply, when the correct balance of total alkalies and the cement is absorbed by the "scavenger" inhibitor.

I claim:

1. A glass reinforced cement mix suitable for high tensile strength applications such as surface bonding of cement blocks or the like or in the formation of concrete articles and characterized by a resistance to alkali-glass reaction resulting in loss of tensile strength, said cement mix comprising:

| | Parts by weight |
| --- | --- |
| Portland cement | 100 |
| Hydrated lime | 0–30 |
| Alkali susceptible E-glass reinforcement elements | 2–15 |
| Aggregate filler | 0–300 |
| Inhibitor for alkali-aggregate expansion reaction, ASTM-C-441 | 0–15 |
| Finely divided alkali reactive scavenger material containing at least 65% SiO$_2$ and comprising 30–325 mesh powdered soda lime glass | 1–7 | said scavenger material having a reactivity with the alkali content of said Portland cement which is substantially greater than the reactivity of said glass reinforcement elements therewith whereby the alkali content of said Portland cement reacts with said scavenger material in preference to said glass reinforcement element.

2. A glass reinforced cement mix suitable for high tensile strength applications such as surface bonding of cement blocks or the like or in the formation of concrete articles and characterized by a resistance to alkali glass reaction resulting in loss of tensile strength, said cement mix comprising:

| | Parts by weight |
| --- | --- |
| Portland cement | 100 |
| Hydrated lime | 13–22 |
| Fine sand aggregate | 100–160 |
| 1/2" chopped glass fiber reinforcement | 4–7 |
| 30–325 mesh soda-lime glass scavenger inhibitor | .4–2 |
| BaCl$_2$ expansion inhibitor | .5–3 |
| Set accelerating admixture | 1–3 |
| Water retaining admixture | .1–.4 |
| Mineral oxide pigments | 0–12 |

3. A surface bonded wall comprising an assembly of stacked concrete blocks and a glass reinforced surface bonding cement coating applied over at least one surface of the assembly of stacked concrete blocks and serving to bond the blocks together without the necessity of mortar between the blocks, said surface bonding cement coating being characterized by a resistance to alkali degradation of the glass reinforcement resulting in loss of tensile strength, and said cement coating comprising an inorganic cementitious binder containing at least one reactive alkali compound, glass reinforcement, and a finely-divided alkali-reactive scavenger material, said scavenger material containing silica as the major constituent thereof and having a reactivity with the alkali content of said binder which is substantially greater than the reactivity of said glass reinforcement therewith whereby the alkali content of said binder reacts with said scavenger material in preference to the glass reinforcement to protect the glass reinforcement from degradation from the alkali content of the binder, and the amount of said scavenger material, based upon the silica content thereof, being at least in stochiometric proportion to the alkali content of said binder.

* * * * *

UNITED STATES PATENT OFFICE
CERTIFICATE OF CORRECTION

PATENT NO. : 4,090,884
DATED : May 23, 1978
INVENTOR(S) : Friedrich Goeman

It is certified that error appears in the above-identified patent and that said Letters Patent are hereby corrected as shown below:

Column 4, Line 8, Table 1, below 22 days at 77° F, insert the following column heading --Days at 122°F--;

Column 8, Line 52, under 28 days, change "185,000 to --85,000--.

Signed and Sealed this

Thirtieth Day of January 1979

[SEAL]

Attest:

RUTH C. MASON
Attesting Officer

DONALD W. BANNER
Commissioner of Patents and Trademarks